Patented May 26, 1942

2,284,482

UNITED STATES PATENT OFFICE 2,284,482

HALO-SUBSTITUTION OF MIXTURES CONTAINING SATURATED ORGANIC COMPOUNDS

William E. Vaughan and Frederick F. Rust, Berkeley, Calif., assignors to Shell Development Company, San Francisco, Calif., a corporation of Delaware No Drawing. Application February 13, 1940, Serial No. 318,716

12 Claims. (Cl. 260—662)

The present invention relates to halogenation, and more particularly pertains to an improved and economical process for halogenating, via substitution, a saturated organic compound of the class of saturated aliphatic and cycloaliphatic hydrocarbons, as well as of their partially halogenated derivatives, preferably having at least two carbon atoms per molecule. In one of its most specific embodiments, the invention is particularly applicable to the halogenation, via substitution, of mixtures containing one or more of the above-defined organic compounds and oxygen or an oxygen-containing gas, such as air.

The halides of saturated aliphatic and cycloaliphatic hydrocarbons find numerous uses both as intermediates and as final products. For example, ethyl chloride and ethyl bromide are employed for the preparation of tetraethyl lead. Ethyl chloride is also the primary material for making ethyl cellulose, as well as of ethyl mercaptan which in itself is an intermediate in the preparation of sulfonal, a known soporific. Also, ethyl chloride is used as a refrigerant and as a local freezing anesthetic for minor operations. The other saturate aliphatic and alicyclic halides are also highly useful and valuable products. For instance, cyclopentyl chloride, itself a good solvent, is an intermediary for the preparation of cyclopentanol, which is employed in lacquer manufacture.

It is known that saturated aliphatic and/or cycloaliphatic hydrocarbons, as well as their products of partial halogenation, may be halogenated or further halogenated, by reacting them with a halogen, such as chlorine, bromine or iodine, at an elevated temperature which induces a "substitution reaction" in which a halogen atom is substituted for a hydrogen atom attached to a carbon atom of the hydrocarbon molecule. It is also known that such halo-substitution reactions between a halogen and a saturated hydrocarbon of the above-defined and hereinbelow more fully described class may be effected efficiently by subjecting the mixture to elevated temperatures which favor the halo-substitution reaction, these temperatures, however, being below those at which substantial degradation and/or decomposition of the reactants and/or reaction products occurs.

It has been previously found that the presence of olefinic hydrocarbons above ethylene inhibits the high temperature halo-substitution of aliphatic and/or alicyclic hydrocarbons so that, to obtain such halo-substitution of these aliphatic and/or alicyclic hydrocarbons, it is necessary to effect the reaction at temperatures which are considerably above those necessary for the halo-substitution of these hydrocarbons when in the absence of such olefinic compounds. This is disclosed in our co-pending application Serial No. 291,365, filed Aug. 22, 1939, now Patent No. 2,246,082, wherein it is shown that olefins of a secondary character, having three or more carbon atoms per molecule, when brought in contact with a halogen at an elevated temperature, for example, above 225° C., not only react with the halogen to produce unsaturated halides, but also retard or even inhibit the halogenation, via substitution, of the saturated aliphatic and/or alicyclic hydrocarbons which may be originally present in the hydrocarbon mixture subjected to the high temperature halogenation reaction. It was also disclosed in the aforementioned copending application that this inhibiting effect of the secondary olefins above ethylene is believed to be due to the interaction of these olefins with the hydrocarbon free radicals which are formed as a consequence of the removal of a hydrogen atom from the saturated hydrocarbon molecule during the reaction. The reaction of the olefins with these free radicals forms relatively larger radicals which, by reason of orientation requirements for successful collision, react less rapidly with the halogen than do the relatively smaller radicals. This, in turn, is believed to retard or even completely inhibit the further continuation of the chain mechanism, thereby retarding and/or inhibiting the halogenation of the saturated organic compounds.

The inhibiting effect of the various olefins having three or more carbon atoms per molecule on halo-substitution reactions, however, varies with the nature of the olefin. For instance it was found that propylene is the most effective inhibitor. On the other hand, the inhibiting effect of ethylene on the high temperature halo-substitution of saturated aliphatic and/or alicyclic hydrocarbons is substantially nil so that in the presence of this olefin, the saturated compounds may be readily subjected to efficient and economical conversion into their products of halo-substitution. The other olefins, although they are less effective than propylene as inhibitors for the halo-substitution of saturated organic compounds, nevertheless may all be considered as such inhibitors, none of them possessing the characteristics of ethylene, as this is disclosed and claimed in the aforementioned copending application Serial No. 291,365. Similarly, the unsaturated halides, such as allyl and vinyl chlorides, also possess the aforementioned inhibiting power.

The inhibitory effect of oxygen on the halo-substitution of saturated organic compounds is well known. Also, in our co-pending application Serial No. 293,486, filed September 5, 1939, now Patent No. 2,278,527, it was disclosed that oxygen, or an oxygen-containing gas, such as air, at least when present in small and definite quantities or percentages, promotes the halo-substitution of unsaturated organic compounds of primary and secondary character, so that the halo-substitution thereof may be effected at temperatures below those which may be necessary for the halo-substitution of these unsaturated organic compounds in the absence of such oxygen. Furthermore, it has been previously discovered that oxygen apparently inhits the halo-addition reaction so that the resultant product, although obtained at temperatures at which normally considerable halo-addition products would be present, are substantially free from such saturated halides as may be produced by halo-addition.

In view of the above knowledge it would normally be expected that the presence of oxygen during the high temperature halogenation of a mixture of saturated and unsaturated aliphatic and/or alicyclic organic compounds, such as aliphatic and/or alicyclic hydrocarbons, would catalyze the halo-substitution of the unsaturated hydrocarbons, while inhibiting the halo-substitution of the saturated compounds. On the contrary, as will be more fully shown in the following description and in the examples, the halo-substitution of unsaturated organic compounds, such as olefins and/or cyclo-olefins, will be retarded or even substantially inhibited if such reaction is attempted to be effected in the presence of oxygen and of saturated aliphatic and/or alicyclic compounds of the described class. It has been discovered, however, contrary to all expectations, that the halo-substitution of saturated aliphatic and/or alicyclic organic compounds, which halo-substitution has been suppressed or inhibited by the presence of oxygen, may be promoted or catalyzed by the addition to the reaction mixture of unsaturated organic compounds, such as olefins and/or cyclo-olefins. It has been further discovered that the halogenation of saturated aliphatic and/or alicyclic organic compounds, the halo-substitution of which has been inhibited by the presence of oxygen, is proportional to some function of the concentration of the unsaturated hydrocarbons in the oxygen-containing mixture of saturated and unsaturated organic compounds subjected to high temperature halogenation. In fact, when the unsaturates are present in excess of the halogen, the reaction rate between the saturates and the halogen is proportional to the square of the unsaturate concentration, while, in the case where the halogen is in excess of the unsaturates, this reaction rate is directly proportional to the first power of the molal concentration of the unsaturates, such as olefins, in the reaction mixture.

It is to be noted that the saturated aliphatic and/or alicyclic compounds of the above-defined and hereinbelow more fully described class may be halogenated without the addition of the unsaturated compounds even though oxygen is present in the reaction mixture. This may be accomplished by raising the operating temperature. In other words, the presence of oxygen merely elevates the onset temperature, i. e. the temperature at which the halo-substitution reaction is initiated. For example, if a saturated aliphatic hydrocarbon may be effectively halogenated at a given temperature, the addition to such halogen-hydrocarbon mixture of a specified percentage of oxygen or of an oxygen-containing gas will retard or even totally inhibit the reaction if attempted at the same temperature. However, by raising such temperature, it is possible to offset the inhibiting effect of the oxygen and to effect the halo-substitution reaction. Since some saturated aliphatic and/or alicyclic hydrocarbons, particularly the lower boiling fractions, such as those obtained during petroleum refining operations, frequently contain oxygen or air, and since the removal of such oxygen, for instance, by treatment with chromous chloride or sulphate solutions, is frequently undesirable because of cost, the halogenation of such oxygen-containing saturated compounds would necessitate the use of excessively high temperatures, which in turn would raise the cost of manufacture of the organic halides. Also, the high temperatures will cause excessive decomposition of the reactants, thus decreasing the yield of the desired halides. These defects are all avoided by effecting the halo-substitution in accordance with the process of the present invention.

The invention may therefore be broadly stated to reside in a process for halogenating saturated aliphatic and/or alicyclic hydrocarbons, as well as their products of partial halogenation, the halogenation of which compounds has been inhibited or suppressed by the presence of oxygen, which comprises effecting the halogenation of such compounds in the presence of oxygen and of unsaturated hydrocarbons, at elevated temperatures which are, however, below those which are necessary for the halogenation of the saturated compounds in the presence of oxygen, but in the absence of the unsaturated hydrocarbons.

The invention further resides in the process for the halo-substitution of saturated organic compounds of the class of saturated aliphatic and alicyclic hydrocarbons and of the products of their partial halogenation, which compounds are in admixture with oxygen or an oxygen-containing gas, such as air, this process comprising the steps of adding unsaturated aliphatic or alicyclic hydrocarbons, such as olefins or cyclo-olefins, to the oxygen-containing saturated organic compound, and subjecting the mixture thus produced in a vapor state to the action of a halogen, e. g. chlorine, bromine and/or iodine, at an elevated temperature below that at which substantial decomposition of the carbon structure occurs. As stated above, the presence of the unsaturated compounds, in effect, offsets the inhibitory effect of the oxygen so that the halo-substitution of the saturated compounds may be realized at considerably lower temperatures as compared to those which would be necessary for the halo-substitution of mixtures containing saturated organic compounds and oxygen, but which do not contain any unsaturated compound, such as olefins and/or cyclo-olefins. Depending on the saturated compound to be halogenated and on the oxygen concentration, the onset temperature, i. e. the temperature at which halo-substitution begins to occur, as well as the degree of such halo-substitution may be varied by changing or modifying the concentration of the unsaturates, it being noted that the degree of such halo-substitution of the saturates is proportional to some function of the molal concentration of the unsaturates in the mixture subjected to halogenation. In view of this, the operating temperature will depend on a number of variables, such as the specific saturated organic compound to be halo-substituted, the unsaturated hydrocarbon employed, its concentration, concentration of oxygen in the mixture, degree of halo-substitution desired, reaction residence time, etc. It may be generally stated, however, that such operating temperature will be above about 250° C., and preferably considerably higher in order to obtain high yields of the desired products of halo-substitution of the particular saturated organic compound subjected to halogenation. However, this operating temperature should be preferably below that at which substantial decomposition or cracking of the carbon structure occurs, since above such temperature the formation of tars and/or coke will decrease the yield of the desired products of halo-substitution. The optimum operating temperature will also vary with the time during which the reactants are subjected to the halogenation reaction temperatures. Generally, with longer residence periods, lower temperatures may be used.

The invention may be executed in a batch, intermittent or continuous manner. Preferably, the saturated organic compound containing oxygen or an oxygen-containing gas, as well as the halogen and the unsaturated hydrocarbon which is to be added to the mixture to promote or catalyze the halo-substitution of the saturated compound or compounds, should be separately preheated substantially to the optimum or desired temperature, and then commingled at such temperature substantially at or near the inlet to the reaction chamber. Such an operation prevents or inhibits undesirable side-reactions which may occur if the reactants are brought together at lower temperatures or in a liquid phase. In the alternative, the saturated organic compound contaminated with air or oxygen may be commingled with the olefins or the like, prior to the preheating, after which this preheated mixture is commingled with the halogen which may or may not be preheated to the desired or optimum temperature which promotes or causes the desired halo-substitution.

As representative compounds which may be halogenated according to the present invention, reference may be made to alkyl hydrocarbons, as ethane, propane, butanes, pentanes and their higher homologues, alicyclic or polymethylene hydrocarbons such as cyclopropane, methyl cyclopropane, cyclobutane, cyclopentane, etc., as well as the partially halogenated derivatives of the saturated aliphatic and cyclo-aliphatic hydrocarbons, such as ethyl chloride, n-propyl bromide, n-propyl chloride, secondary butyl chloride, dichlorbutane, monochlorcyclopentane, and the like and their homologues and analogues. The saturated aliphatic or alicyclic compounds may also be linked to one or more aromatic radicals. For example, compounds which may be treated according to the present invention include phenyl alkyl hydrocarbons. Also, saturated aliphatic and/or alicyclic acids, ketones, alcohols, esters, etc., fall within the class of compounds which may be employed as the primary material and which may be halogenated via substitution in accordance with the process of the present invention.

As to the unsaturated organic compounds which are suitable as substances which promote the high temperature halo-substitution of the above-described saturated compounds (the halogenation of which has been inhibited by the presence of oxygen), reference may be made to aliphatic and alicyclic olefins, such as ethylene, propylene, butene-1, butene-2, cyclo-butene, cyclopentene, and the like and their homologues and analogues, as well as to halo-substituted unsaturated aliphatic and cyclo-aliphatic hydrocarbons, as vinyl chloride, vinyl bromide, allyl chloride, cyclopentenyl chloride and the like, their homologues and analogues.

The invention is illustrated by the following examples which are presented herein for the purpose of showing the advantages derived from operation in accordance with the process of the present invention, as well as for the purpose of indicating the results obtained thereby. These examples, however, are not to be considered as limiting the invention in any sense.

*Example I*

A mixture of ethylene, chlorine and oxygen was diluted with nitrogen, and was conveyed through a reaction zone at a rate of 50 c.c./min. of ethylene, 25 c.c./min. of chlorine, 225 c.c./min. of nitrogen and 1.5 c.c./min. of oxygen. The reaction chamber was maintained at a temperature of about 327° C. An analysis of the effluent gases and of the reaction product showed that about 95% of the chlorine reacted with the ethylene, the products of reaction predominating in vinyl chloride produced by the substitution of chlorine into the ethylene.

*Example II*

This run was effected in the same reaction chamber and under the same operating conditions as those employed in the above example, the only difference between the two runs being that in the present run ethane was added in a quantity equal to 50 c.c./min. and that only 175 c.c./min. of the nitrogen were employed. This substitution of ethane for a part of the diluent markedly lowered the reaction rate, only about 15% of the chlorine being found to have reacted. Also, an analysis of the reaction product showed that it predominated in ethyl chloride.

*Example III*

A gaseous mixture of ethane, chlorine and nitrogen, in a volumetric ratio of 2:1:4.5, was passed at a total rate of about 300 c.c./min., together with oxygen in a quantity of about 1.5 c.c./min. to the same reaction chamber as that employed above. The reaction temperature was maintained at 327° C. An analysis of the effluent gases failed to show any reaction between the ethane and the chlorine.

A comparison of the results described in the above examples clearly shows that an olefin chlor-substitution reaction catalyzed by the presence of small quantities of oxygen, is, in turn, inhibited by the addition of a saturated aliphatic hydrocarbon, it being noted that when such saturated hydrocarbon is added there is substantially no chlor-substitution into the olefin. Furthermore, the examples show the advantages obtained when an olefin is added to an oxygen-containing paraffin-chlorine mixture. Thus, whereas the oxygen inhibited the chlor-substitution into the ethane, the addition of ethylene to such oxygen-containing mixture caused the reaction of about 15% of the chlorine and the resultant formation of ethyl chloride.

Example IV

A mixture of ethane, ethylene, chlorine, oxygen and carbon dioxide (diluent) was conveyed through a reaction chamber at a rate of about 100 c.c./min. of ethane, 50 c.c./min. of chlorine, 45 c.c./min. of $CO_2$ and 1.5 c.c./min. of oxygen. The reaction chamber, which consisted of a Pyrex glass tube 45 cm. long and 1.35 cm. internal diameter, was maintained at a temperature of 336° C. The reactants, prior to commingling, were separately preheated to the reaction temperature, and were then mixed at such temperature substantially at the entrance to the reaction zone. The reaction was quite vigorous, there being considerable carbon formation. An analysis of the effluent reaction product showed the following distribution:

|  | Mol. percent |
|---|---|
| Ethyl chloride | 60 |
| Vinyl chloride | 12 |
| 1,1-dichlorethane | 16 |
| Trichlor-ethanes | 12 |

This test clearly shows that the reaction is primarily one of chlor-substitution into the ethane.

Example V

A mixture of ethane, ethylene, chlorine and oxygen in a volumetric ratio of 1:2:2:1 was conveyed at a total rate of about 300 c.c./min. through the Pyrex glass reaction chamber described in Example IV. When the reaction was effected at 343° C., about 10.5% of the chlorine reacted. At a temperature of 374° C. an analysis of the effluent gases showed that about 60% of the chlorine reacted by substitution, this substitution rising to about 72% at a reaction temperature of 404° C. Despite the fact that the chlorination under these conditions depends upon the presence of the olefin, as this is shown by the fact that when the ethylene in the above mixture was replaced by a diluent, such as carbon dioxide, and when the reaction was effected at 374° C., only about 4% of the chlorine reacted (as compared to the 60% conversion obtained in the presence of the ethylene), an analysis of the reaction products shows that chlor-substitution into the ethane, and therefore the formation of ethyl chloride, is the principal reaction. This clearly indicates that the olefin catalyzes the paraffin chlor-substitution reaction, while the presence of such saturated hydrocarbon inhibits the chlorination of the unsaturates present in the reacting mixture.

Example VI

A series of chlorination tests were conducted with a mixture containing ethane, ethylene, chlorine, oxygen, and nitrogen as diluent. In all of these tests the rates of throughput of chlorine, or ethane and of oxygen were maintained constant, these substances being conveyed through the reactor in the following quantities: 50 c. c./min. of chlorine, 50 c. c./min. of ethane and 1.5 c. c./min. of oxygen. The total rate of introduction of ethylene and nitrogen was also maintained constant at 195 c. c./min. However, the respective quantities of these two substances were varied from test to test. All of the reactions were effected in the above described Pyrex glass tube maintained at about 327° C. The rates of ethylene and nitrogen employed in each of the tests, and the percent chlorine which reacted by substitution are shown in the following table:

| Rate of introduction, in c. c./min. | | Percent chlorine substituted |
|---|---|---|
| Ethylene | Nitrogen | |
| 0 | 195 | 1.8 |
| 10 | 185 | 5.0 |
| 25 | 170 | 11.8 |
| 50 | 145 | 20. |

An analysis of the reaction products indicated that ethyl chloride was the principal product of reaction, only very small quantities of vinyl chloride being detected.

Example VII

A series of tests were effected with constant throughputs of chlorine, ethane and oxygen. The rate of introduction of ethylene and nitrogen was varied as in the previous example. However, in the present series, the ethylene was always maintained in excess of the chlorine employed. The reactions were effected at a temperature of about 327° C., the reactants being employed in the following quantities: 12.5 c. c./min. of chlorine, 50 c. c./min. of ethane, 1.5 c. c./min. of oxygen and 230 c. c./min. of ethylene and nitrogen. The specific throughputs of these last mentioned two substances, as well as the effect of varying the quantity of ethylene employed on the degree of chlor-substitution of the ethane are given in the following table:

| Rate of introduction, in c. c./min. | | Percent chlorine reacting via substitution |
|---|---|---|
| Ethylene | Nitrogen | |
| 50 | 180 | 5.6 |
| 100 | 130 | 11.2 |
| 150 | 80 | 22.4 |
| 200 | 30 | 42.4 |
| 230 | 0 | 56.0 |

As in the case of the products of reaction obtained in the previous example, the principal reaction product found in the reaction products was ethyl chloride, thus showing that the presence of the ethylene promotes or catalyzes the halo-substitution of the saturated hydrocarbon, i. e. ethane.

An analysis of the data and results described in Examples V and VI shows that other conditions being equal, an increase in the quantity of olefin added to an oxygen-containing paraffin-halogen mixture, increases the yield of products of halo-substitution of the paraffins. Also, as long as the olefin is present in a quantity not in excess of that of the halogen, this increase in the degree of halo-substitution is only directly proportional to the increase in the olefin content, whereas, when the olefin is present in quantities in excess of that of the halogen, the degree or percent of chlor-substitution of the paraffins is proportional to the square of the mol. concentration of the olefins in the oxygen-containing mixture of saturated and unsaturated organic compounds subjected to the high temperature halogenation in accordance with the process of the present invention.

The carbon dioxide and the nitrogen were employed in the above examples merely for the purpose of diluting the hydrocarbon-chlorine mixture. Such dilution facilitates controlling the reaction since it prevents or decreases excessive decomposition, tar and carbon formation, and flashing of the mixture. Obviously, the use of such diluent may be dispensed with, or other inert diluents, such as helium, may be employed in connection with or in lieu of the aforementioned diluents.

The reaction may be effected at any suitable pressure. Generally, the halo-substitution reaction according to the present invention may be effected at atmospheric pressures. However, somewhat higher or lower pressures may also be employed.

Although the invention has been described with particular reference to the chlorination of ethane in the presence of oxygen and ethylene, it is to be understood that other saturated organic compounds and their partially halogenated derivatives (containing oxygen admixed therewith) may be halogenated, i. e. subjected to chlorination, bromination and/or iodination, via substitution, in accordance with the process of this invention by the addition to such mixture to be halogenated of an unsaturated organic compound, such as an olefin or cyclo-olefin.

Generally it is preferable to employ an amount of halogen not in excess of that theoretically required to react with all of the saturated aliphatic and/or alicyclic organic compound to be halogenated. The presence of an excess of halogen is usually to be avoided since such excess is conducive to the formation of undesirable highly halogenated products. On the other hand, the maintenance of an excess of the halogenatable compound prevents such side reactions and is therefore desirable.

The reaction or residence time will vary depending on the specific organic compound to be subjected to treatment, the molal concentration and character of the olefin and/or cyclo-olefin added, as well as on the oxygen and halogen concentrations and the temperature employed.

We claim as our invention:

1. In a process for the production of ethyl chloride from ethane which is contaminated by the presence of oxygen, the steps of adding ethylene to the oxygen-contaminated ethane and subjecting the mixture to the action of chlorine in the vapor state at a temperature of between about 250° and 425° C., thereby effecting the chlor-substitution into the ethane to the substantial exclusion of reactions between the chlorine and ethylene, and separating the ethyl chloride thus produced from the reaction mixture.

2. The process according to claim 1 wherein the reactants are maintained at the reaction temperature for a period of time insufficient to effect the decomposition of the carbon structures of the organic reactants and of the reaction product.

3. In a process for the production of ethyl chloride from ethane which is contaminated by the presence of oxygen, the steps of adding ethylene to the oxygen-contaminated ethane, subjecting said mixture to the action of chlorine in the vapor state at a temperature of above 250° C. and for a period of time insufficient to effect the decomposition of the carbon structure of the organic reactants and reaction product, thereby effecting the chlor-substitution into the ethane to the substantial exclusion of reactions between the chlorine and the ethylene, and separately recovering the ethyl chloride from the reaction mixture.

4. In a process for the production of ethyl halides from ethane which is contaminated by the presence of oxygen, the steps of adding, to such oxygen-ethane mixture, an unsaturated organic compound selected from the group consisting of aliphatic and alicyclic olefins and of their products of halo-substitution, subjecting the mixture thus obtained in the vapor state to the action of a halogen selected from the group consisting of chlorine, bromine and iodine at a temperature of about 250° C. but below that at which substantial decomposition of the carbon structure of the organic reactants and of the reaction product occurs, thereby effecting the halo-substitution of the ethane to the substantial exclusion of reactions between the halogen and the added unsaturated organic compound, and separately recovering the ethyl halide from the resulting reaction mixture.

5. The process according to claim 4, wherein the unsaturated organic compound added to the oxygen-contaminated ethane is an olefin.

6. The process according to claim 4 wherein ethylene is added to the oxygen-contaminated ethane.

7. In a process for the halo-substitution of saturated aliphatic hydrocarbons which are contaminated by the presence of oxygen, the steps of adding to said oxygen-contaminated saturated aliphatic hydrocarbon an unsaturated organic compound selected from the group consisting of aliphatic and alicyclic olefins and of their products of halo-substitution, subjecting the mixture thus produced, in the vapor state, to the action of a halogen selected from the group consisting of chlorine, bromine and iodine at a temperature of above 250° C. but below that at which substantial decomposition of the organic reactants and of reaction products occurs, thereby effecting the halo-substitution of the saturated aliphatic hydrocarbons to the substantial exclusion of reactions between the halogen and the added unsaturated organic compound, and separately recovering the alkyl halides thus produced.

8. The process according to claim 7 wherein the reaction is effected in the presence of an inert diluent, thereby facilitating the control of the halo-substitution reaction.

9. In a process for the halogenation of saturated cycloaliphatic hydrocarbons which are contaminated by the presence of oxygen, the steps of adding to said oxygen-contaminated saturated cycloaliphatic hydrocarbons organic compound an unsaturated organic compound selected from the group consisting of aliphatic and alicyclic olefins and of their products of halo-substitution, subjecting said mixture to the action of a halogen selected from the group consisting of chlorine, bromine and iodine in a vapor state at a temperature of above 250° C. but below that at which substantial decomposition occurs, thereby effecting the halogenation of the saturated cycloaliphatic hydrocarbons organic compounds while inhibiting the halogenation of the unsaturated compounds, and separately recovering the saturated halides thus produced.

10. In a process for the halogenation of saturated organic compounds of the group consisting of aliphatic hydrocarbons, cycloaliphatic hydrocarbons, and partially halogenated aliphatic and cycloaliphatic hydrocarbons containing at least one hydrogen atom linked to a carbon atom which are contaminated by the presence of oxygen, the steps of adding an unsaturated organic compound selected from the group consisting of aliphatic and alicyclic olefins and of their products of halo-substitution to said oxygen-contaminated saturated organic compound, and subjecting the mixture thus obtained to the action of a halogen selected from the group consisting of chlorine, bromine and iodine in a vapor state and at an elevated temperature above that normally employed in reactions involving halogen addition to olefins, whereby the halo-substitution of the saturated organic compound is effected at a temperature below that which would be necessary for the same degree of halo-substitution of the oxygen-contaminated saturated organic compound in the absence of said unsaturated organic compound.

11. In a process for the halogenation of saturated organic compounds of the group consisting of aliphatic hydrocarbons, cycloaliphatic hydrocarbons, and partially halogenated aliphatic and cycloaliphatic hydrocarbons containing at least one hydrogen atom linked to a carbon atom which are contaminated by free oxygen, the step of subjecting the oxygen-contaminated saturated organic compound, in the vapor phase and at a temperature above 250° C. but below that at which substantial decomposition of the carbon structure occurs to the action of a halogen selected from the group consisting of chlorine, bromine and iodine in the deliberate presence of an unsaturated organic compound selected from the group consisting of aliphatic and alicyclic olefins and of their products of halo-substitution, thereby effecting the halo-substitution of said saturated organic compound.

12. In a process for the halogenation of saturated organic compounds of the group consisting of aliphatic hydrocarbons, cycloaliphatic hydrocarbons, and partially halogenated aliphatic and cycloaliphatic hydrocarbons containing at least one hydrogen atom linked to a carbon atom which are contaminated by free oxygen, the step of reacting the oxygen-contaminated saturated organic compound in a vapor state with a halogen selected from the group consisting of chlorine, bromine and iodine, in the deliberate presence of an unsaturated organic compound selected from the group consisting of aliphatic and alicyclic olefins and of their products of halo-substitution, said reaction being effected at an elevated temperature above that normally employed in reactions involving halogen addition into olefins.

WILLIAM E. VAUGHAN.
FREDERICK F. RUST.

CERTIFICATE OF CORRECTION.

Patent No. 2,284,482. May 26, 1942.

WILLIAM E. VAUGHAN, ET AL.

It is hereby certified that error appears in the printed specification of the above numbered patent requiring correction as follows: Page 5, second column, line 13, claim 4, for "about" read --above--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.